United States Patent [19]
Kell

[11] 3,905,562
[45] Sept. 16, 1975

[54] VEHICLE SAFETY BELT RETRACTORS

[75] Inventor: John Kell, Carlisle, England

[73] Assignee: Kangol Magnet Limited, London, England

[22] Filed: May 25, 1973

[21] Appl. No.: 364,069

[52] U.S. Cl. ............................................. 242/107.4
[51] Int. Cl.² ............................................ B65H 75/48
[58] Field of Search............ 242/107.4, 107.2, 107.3, 242/107 SB, 107.5, 107.6, 107.7, 107 R; 297/386, 387, 388; 280/150 SB

[56] References Cited
UNITED STATES PATENTS

| | | | |
|---|---|---|---|
| 3,248,069 | 4/1966 | Nichols............................ | 242/107.4 |
| 3,421,605 | 1/1969 | Hansen............................ | 242/107.4 X |
| 3,482,799 | 12/1969 | Wrighton et al.................. | 242/107.4 |
| 3,495,786 | 2/1970 | Hemens........................... | 242/107.4 |
| 3,552,676 | 1/1971 | Weber............................. | 242/107.4 |
| 3,593,942 | 10/1972 | Rex................................ | 242/107.4 |
| 3,604,655 | 9/1971 | Jones.............................. | 242/107.4 |
| 3,666,198 | 5/1972 | Neumann........................ | 242/107.4 |
| 3,754,722 | 8/1973 | Nohren........................... | 242/107.4 |
| 3,834,646 | 9/1974 | Heath............................. | 242/107.4 X |

*Primary Examiner*—John W. Huckert
*Assistant Examiner*—John M. Jillions
*Attorney, Agent, or Firm*—Young & Thompson

[57] ABSTRACT

A retractor for a vehicle safety belt has a housing rotatably supporting a shaft from which a belt can be unwound against the tension of a rewind spring, a flywheel freely journalled on the shaft to rotate therewith and a pawl eccentrically journalled on the shaft and movable by the flywheel on retardation thereof relative to the shaft from an inoperative position to a locking position in which the pawl is engaged between the shaft and internal teeth of the housing to prevent rotation of the shaft to unwind the belt. The inertia of the flywheel results in such retardation when the belt is pulled abruptly and a pendulum holds the flywheel against rotation on sensing acceleration of the retractor. Shock absorbing means such as a spring clutch between the internal teeth and the housing can be provided.

9 Claims, 7 Drawing Figures

VEHICLE SAFETY BELT RETRACTORS

The invention relates to a retractor for a vehicle safety belt of the kind comprising a shaft from which the belt can be unwound against the tension of a rewinding spring.

Such retractors are provided with means to prevent further withdrawal of the belt when either or both of the belt or the retractor experiences an acceleration in excess of a predetermined amount, as would occur if the vehicle were involved in a collision, so that the belt holds its user in his seat.

The present invention is concerned with the provision of improved locking arrangements for such a retractor.

The invention accordingly provides a retractor for a vehicle safety belt, the retractor comprising a housing rotatably supporting a shaft from which a belt can be unwound against the tension of a rewind spring, a first member journalled on the shaft for rotation by rotation of the shaft in the belt unwinding direction, and a second member movable by the first member on retardation thereof relative to the shaft from an inoperative position to a locking position in which the second member is engaged between the shaft and a portion of the housing to prevent relative rotation thereof in a direction to unwind the belt, the first member being arranged to experience such retardation when the belt is abruptly pulled from the retractor.

Preferably, the retractor has inertia means responsive to undue acceleration or deceleration of the retractor to effect the retardation of the first member.

The housing portion may be a fixed part of the housing or secured thereto through an energy absorbing mechanism. The first member is preferably a flywheel coaxially journalled on the shaft, and the second member may be a pawl journalled on the shaft eccentrically. Preferably, the pawl is in itself insensitive to acceleration of the belt. The energy absorbing device can be a friction clutch, but a torsion bar can be employed instead.

The invention will be better understood from the following illustrative description and accompanying drawings.

Figure 1:
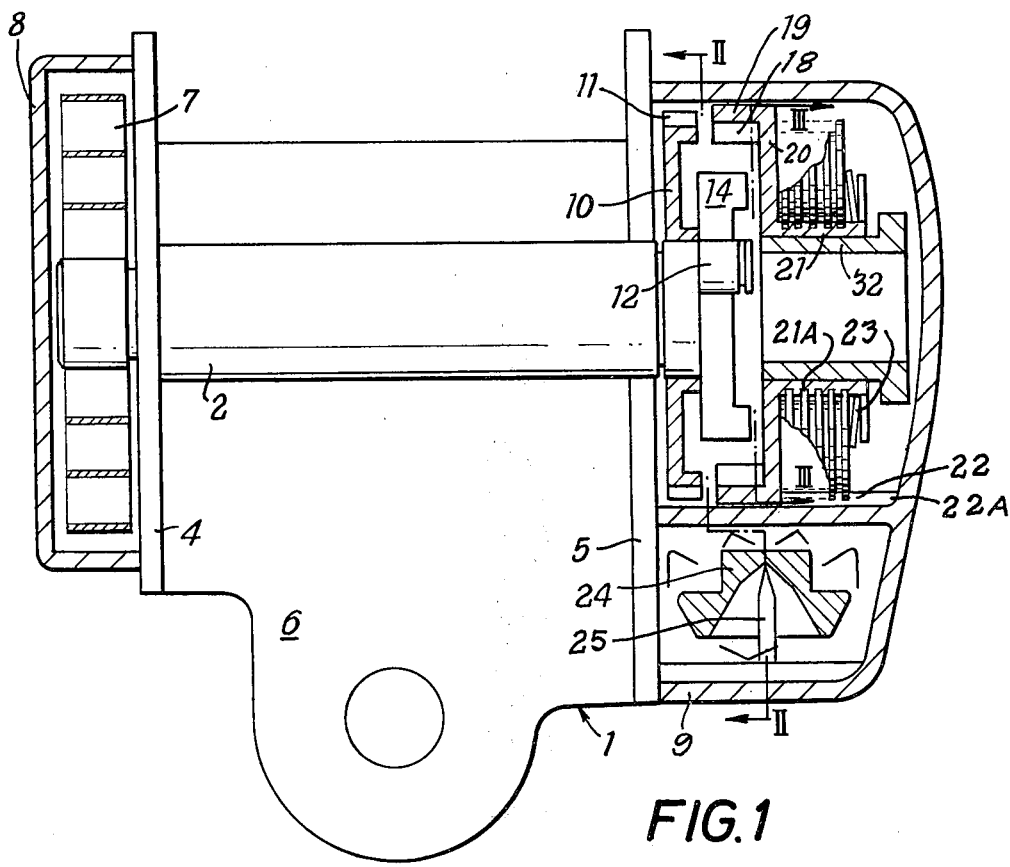
FIG. 1 is a partly schematic, partly sectional side view of a first retractor embodying the invention.

The illustrated safety belt reel or retractor 1 has one end of a safety belt (not shown) secured to a shaft 2 journalled in side webs 4, 5 of a U-shaped pressing, the centre web 6 of which is apertured for mounting of the reel. A spring 7 within a side housing 8 mounted on the outer side of the web 4 acts between the housing and the shaft 2 to oppose unreeling of the belt from the shaft, and is capable of rewinding the unreeled belt. The shaft 2 extends through the other side web 5 into a side housing 9 mounted externally of this web. Adjacent the web 5, the shaft 2 freely journals a flywheel 10 having ratchet teeth 11 around its periphery. An eccentric stub portion 12 of the shaft 2 extends beyond the flywheel 10 and a pawl or catch member 14 in the shape of a recessed disc is freely journalled on the stub portion. Although capable of limited rotation independently of the flywheel, the pawl 14 is held in a normal relationship thereto by a spring 17 acting between the pawl and a stud 13 extending axially from the flywheel. The flywheel 10 has a second axially extending stud 15, which is received in the recess of the catch member 14 and can engage a side wall of this recess so as to act on the catch member. The recess in the catch member 14 is bounded at one outer corner by a projecting catch or tooth portion 16, which is engageable, by pivotation of the catch member on the stub portion 12, with ratchet teeth 18 provided internally on an annulus 19 concentric with the shaft 2. The internally toothed annulus 19 may be secured to or form a part of the side housing 9 but is preferably connected to the housing through a shock or energy absorbing mechanism as shown.

To form the illustrated energy absorbing mechanism, the annulus 19 extends from one side of an annular disc 20 having a sleeve 21 of smaller diameter than the annulus extending from the other side. The sleeve 21, which is also concentric with the shaft 2 is externally splined at 21A, and a member 22 secured in the side housing 9 or forming part of the housing wall surrounds the sleeve and is provided with internal splines 22A. Between the sleeve 21 and the member 22 are provided two sets of annular discs, one set having internal teeth engaging in the splines of the sleeve and the other set having external teeth engaging in the splines of the member. The discs of the two sets are alternated, and a Belville or spring washer 23 engages the discs to apply pressure to them axially, so that the discs form a multiplate clutch. The frictional engagement between each disc of one set in the two adjacent discs of the other set is sufficient to prevent the rotation of the sleeve 21 relative to the side housing 9 except when the former experiences a relatively large torque.

Figure 2:
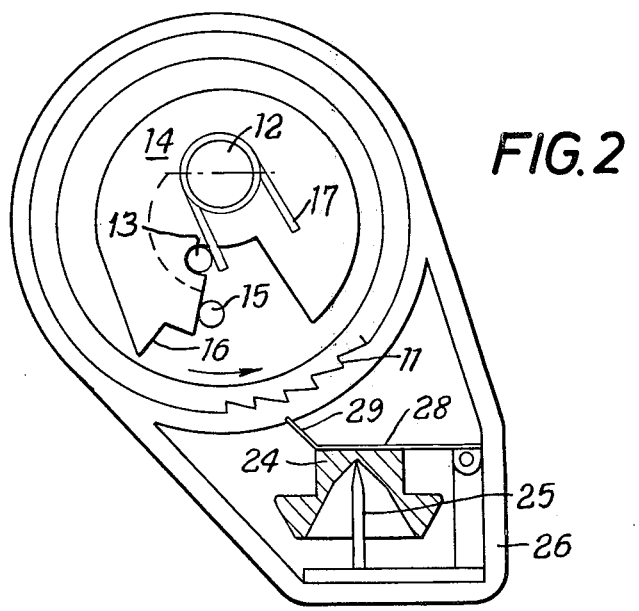
FIG. 2 is a sectional view on the line II—II of FIG. 1.
Figure 3:
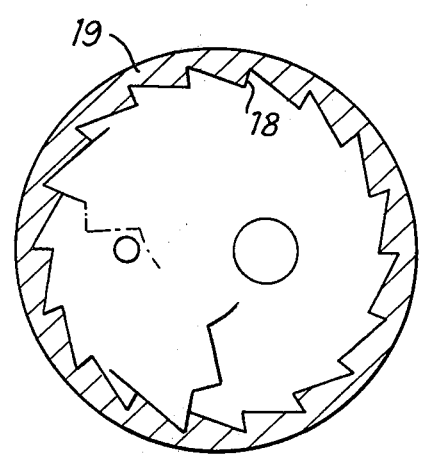
FIG. 3 is a sectional view on the line III—III of FIG. 1.
Figure 4:
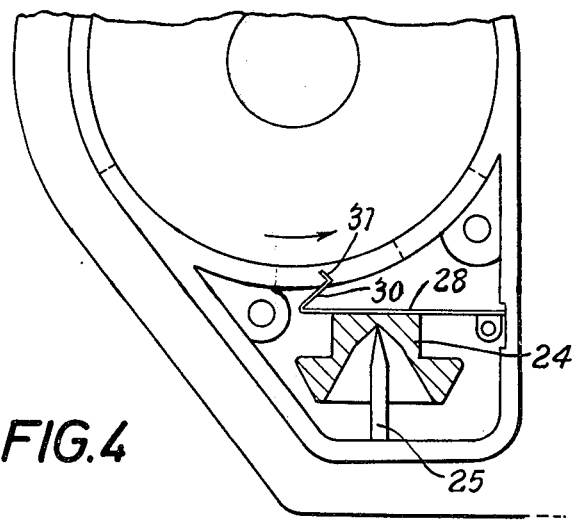
FIG. 4 is a view corresponding to FIG. 2 but showing a modification.

The lower part of the side housing 9 mounts a generally bell-shaped but flat topped pendulum 24 on an upright pin 25, the pendulum constituting a device for sensing acceleration of a vehicle on which the retractor is mounted, of the kind described in Pat. application Ser. No. 180,753 filed Sept. 15, 1971, now abandoned. A support 26 extending upwardly from the side housing floor pivotally mounts a lever 28 which rests along the flat top of the pendulum when the latter is in its rest position, in which the flat top is horizontal. The free end of the lever 28 has a tip portion 29 inclined thereto, as shown in FIG. 2. Alternatively as shown in FIG. 4 the lever 28 can have at its free end a short arm 30 inclined thereto, the arm being provided with a tip portion 31 which is inclined both to the lever and to the arm. In either arrangement, tilting of the pendulum 24 on the pin 25 will cause the lever 28 to pivot so as to bring the tip portion into range of the ratchet teeth 11 on the periphery of the flywheel 10, so that rotation of the flywheel in the direction of the arrow, which corresponds to withdrawl of the belt from the retractor, will be prevented.

The belt may be initially withdrawn from the retractor 1 for use without obstruction. The flywheel 10 and the catch member 14 will turn together as the shaft 2 rotates but the rotation speed of the shaft will normally be such that there is no relative movement by which the tooth portion 16 is brought into a position for engagement by the internal ratchet teeth 18 on the annulus 19.

Suppose now that the belt is sharply accelerated, by being pulled out at more than a certain speed, the pendulum 24 and associated parts being unaffected, or even absent from the retractor. The shaft 2 will rotate quickly but the inertia of the flywheel 10 will cause this to lag on the shaft 2 and the stud 15 will quickly engage on the side of the recess in the catch member 14 adjacent the tooth portion 16 so as to tend to hold the catch member back. It will be clear from FIG. 2 that because the catch member 14 is eccentrically mounted with respect to the shaft and the flywheel, the effect of this engagement will be to cause the toothed portion 16 to move outwardly, to a position in which it will engage with one of the ratchet teeth 18 on the annulus 19. This engagement will immediately prevent further withdrawal of the belt, except in so far as the spring clutch will slip to permit a small movement of the belt thus absorbing energy from the body of the user of the belt.

Should the vehicle experience undue deceleration in any direction as because of a collision, the bell-shaped pendulum 24 will tilt on its pin 25 to an extent sufficient to raise the lever 28 so that the tip portion thereof is in a position to engage the ratchet teeth 11 on the periphery of the flywheel 10. The flywheel 10 is thus prevented from rotating with the shaft 2 in the direction corresponding to a pull on the belt. Such a pull will normally be experienced in circumstances in which the pendulum is tilted to the extent described and the consequent rotation of the shaft 2 will cause movement of the catch member 14 against the now fixed pin 15 on the flywheel 10, and cause engagement of the tooth portion 16 with a tooth of the annulus 19, during further rotation of the shaft 2. The shaft is thus locked to the housing either directly, if no energy absorbing mechanism is provided, or indirectly, through such a mechanism if this is present.

It will be appreciated that engagement between the pendulum actuated lever and the flywheel, and between the flywheel stud and the catch member, serves merely to initiate the locking of the catch member to the annulus and thus directly or indirectly to the housing, which locking is effected as a consequence of outward movement of the belt.

The retractor can be readily modified so that the catch member is moved to the operative position by electric means either instead of as well as by centrifugal forces. The externally splined sleeve 21 can readily be of sufficient internal diameter to surround a bush 32 in which a solenoid device can be mounted. The solenoid device can be arranged to act on the catch member to move it to the operative position either in response to an incoming signal or in response to the cessation of such a signal. Control of the signal can be effected by a remote inertia device responsive to vehicle acceleration, and/or by a vehicle function, for example the attainment of a predetermined speed. The solenoid device is not required to produce a large power output, as it has merely to move the catch member to a position from which locking of the belt ends withdrawal, or engagement with an energy absorbing mechanism, ensues as a result of a pull on the belt, as compared with movement which completes the locking or engagement.

Figure 5:
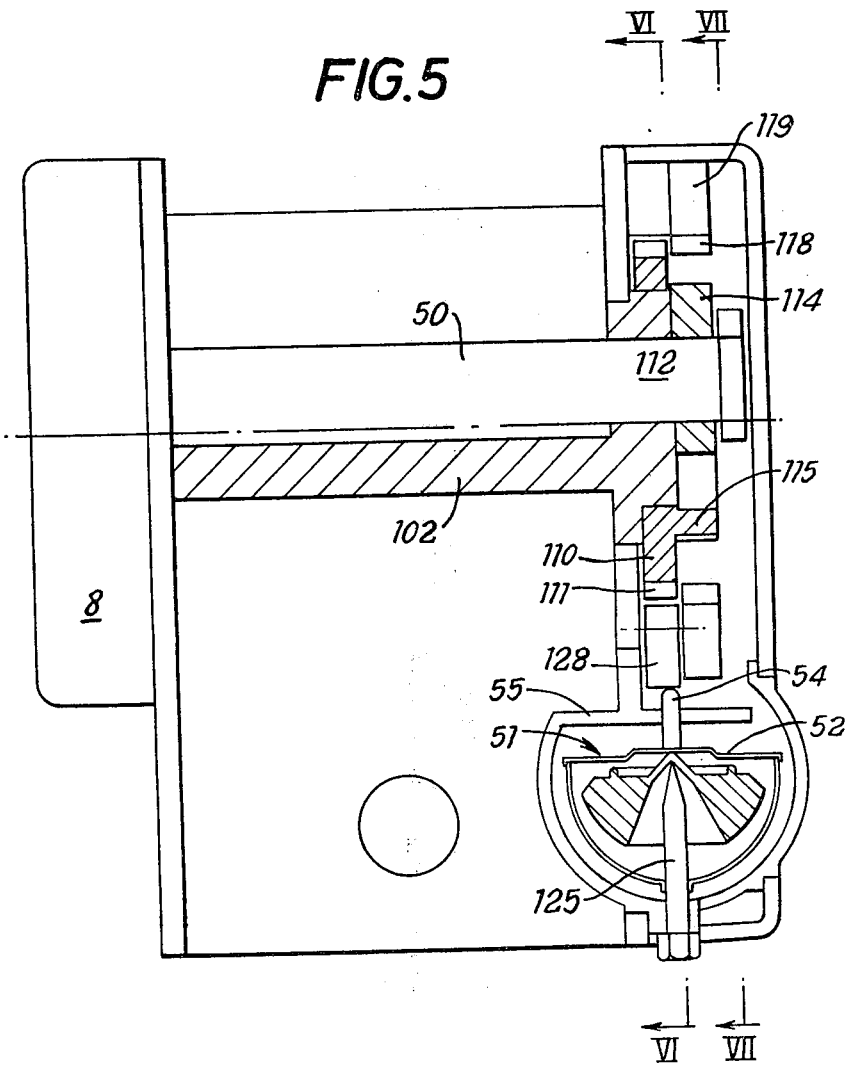
FIG. 5 is a view corresponding to FIG. 1 of a second retractor embodying the invention.
Figure 6:
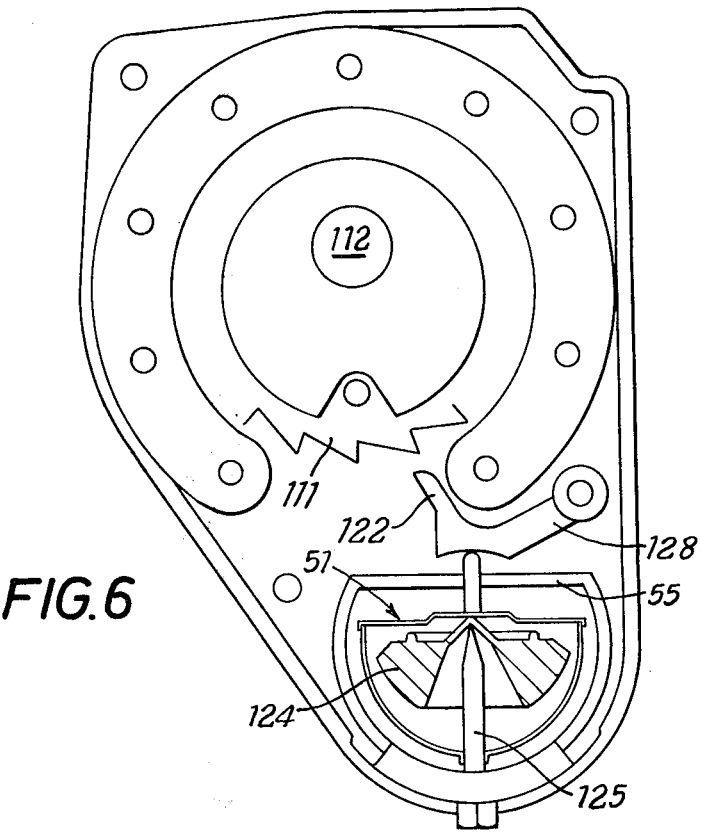
FIG. 6 is a sectional view on the line VI—VI of FIG. 5.
Figure 7:
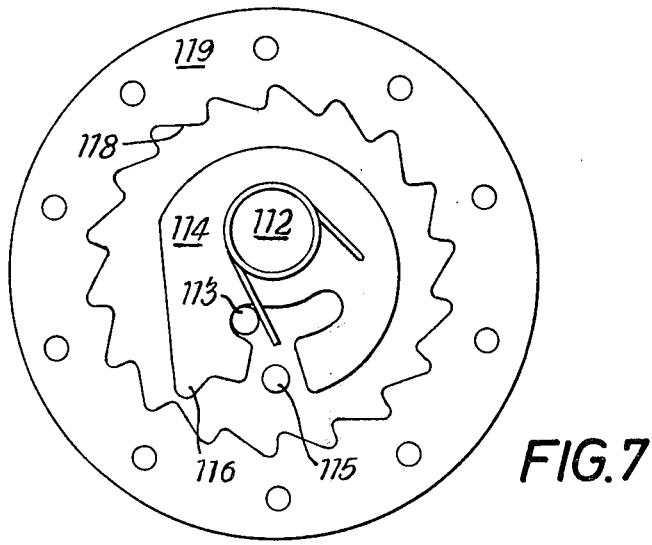
FIG. 7 is a sectional view on the line VII—VII of FIG. 5.

In FIGS. 5 to 7, showing the second embodiment of the invention, parts which are functionally similar to those of FIGS. 1 to 4 are given the reference numerals of FIGS. 1 to 4 increased by 100. The retractor of FIGS. 5 to 7 differs from that of FIGS. 1 to 4 in having no shock absorbing mechanism, and modified shaft and pendulum arrangements.

The pendulum arrangement of FIGS. 5 to 7 is described in Pat. Application Ser. No. 334,199 filed Feb. 21, 1973, now U.S. Pat. No. 3,868,068.

It will be seen from FIG. 5 that the shaft 102 is tubular with a longitudinal slit. A bolt 50 can be inserted axially of the shaft and secured to the shaft to rotate therewith. By this arrangement a belt having a looped end may readily be connected after the rest of the retractor has been assembled. The looped end is pushed through the slit in the absence of the bolt 50 which is then inserted through the loop and secured.

The pendulum 124 is mounted on a pin 125 but is housed within a generally hemispherical capsule 51 of which the generally flat upper wall 52 rests on the pendulum. An operating post 54 projects upwardly from the centre of the upper wall 52. The post 54 is guided for axial movement in a frame 55 and by the reception of the pin 125 in an aperture at the base of the capsule. It will be seen that if the pendulum 124 is sufficiently accelerated, its upper surface will engage the underneath of the wall 52 and cause the capsule 51 and the post 54 to rise, so moving the lever 128 to bring the tip portion 129 thereof into engagement with the teeth 111 of the flywheel 100. If the shaft 102 is in rotation, the stud 115 carried by the flywheel will cause the catch member 114 to pivot on the shaft stud portion 112 to bring the tooth portion 116 of the member into engagement with the teeth 118 of the annulus 119 which is fixedly secured to the housing. The shaft 102 is thus locked against rotation in the unwinding direction of the belt.

It will be understood that the embodiments described can be modified in various ways within the scope of the invention and that parts thereof may be interchanged as appropriate. Thus the pendulum illustrated may for example be replaced by another form of inertia sensing device.

I claim:

1. A vehicle seat belt retractor comprising a housing, s shaft rotatably mounted in the housing, a seat belt having an end thereof secured to the shaft, spring means urging the shaft to rotate to wind the belt thereon, a flywheel member carried on an end of the shaft so as to rotate therewith during rotation of the shaft in the belt unwinding direction below a predetermined speed and so as to lag behind said shaft by rotation relative thereto when said predetermined speed is exceeded, a hub protruding eccentrically from said shaft end, a plate-like pawl member pivotably carried on said hub axially adjacent said flywheel member and having a peripheral recess, a tooth portion on said pawl member, tooth means carried by said housing and located around and radially outwardly of the pawl member, axially extending abutment means on said flywheel member extending into the peripheral recess of said pawl member for engagement therewith, and resilient means maintaining said pawl and flywheel members in a relative position defined by said abutment means in which position the tooth portion is spaced from the tooth means as long as the shaft rotates in the belt unwinding direction below said predetermined speed, said resilient means permitting pivoting of the pawl member on said hub but responsive to lagging of said flywheel member behind said shaft when said speed is exceeded to bring said tooth portion into engagement with said tooth means and thereby check rotation of said shaft in said direction relative to said tooth means.

2. A retractor as claimed in claim 1 having an additional inertia sensing means responsive to a predetermined acceleration or deceleration of the retractor to hold the flywheel member against rotation with the shaft in the unwinding direction, whereby said rotation of the shaft causes said pivoting of the pawl member.

3. A retractor as claimed in claim 2 in which the flywheel member is formed with teeth around the periphery thereof, in which a pivotably mounted catch member is provided, and in which means mounts said catch member for pivotation from a first position spaced from said teeth to a second position in engagement with said teeth to hold the flywheel member against rotation in response to the sensing by said additional inertia sensing means of said predetermined acceleration or deceleration.

4. A retractor as claimed in claim 3 in which the additional inertia sensing means comprises a pendulum, having a downwardly open recess in the underside thereof and an upright mounting member having a free end received within said recess to mount the pendulum for pendulous movement in response to said predetermined acceleration or deceleration, and in which said catch member mounting means mounts said catch member for pivotation from said first to said second position in response to said pendulous movement.

5. A retractor as claimed in claim 4 in which said mounting member comprises a pin having a substantially vertical axis, an actuator plate is located above the pendulum so as to be engageable thereby on the pendulous movement thereof, and guide means are provided above and below the pendulum for guiding the plate for movement coaxially of the mounting member, the catch member mounting means mounting the catch member to be pivoted due to engagement by the actuator plate.

6. A retractor as claimed in claim 5 in which the plate is the planar wall of a substantially hemispherical capsule containing the pendulum.

7. A retractor as claimed in claim 1 having a series of teeth provided on the periphery of the flywheel member, and a lever pivotably mounted to engage with said teeth, the tilting of the pendulum moving the lever to engage the teeth.

8. A retractor as claimed in claim 1 having an energy absorbing means between said housing and said tooth means, said energy absorbing means yieldably holding the belt against withdrawal when the tooth portion is engaged with said tooth means.

9. A retractor as claimed in claim 8 in which said energy absorbing means comprises a first series of plates secured to the housing, a second series of plates interleaved with said first series of plates and secured to said tooth means, and spring means urging said interleaved series of plates into frictional engagement.

* * * * *